United States Patent [19]
Shahrebani

[11] Patent Number: 5,528,690
[45] Date of Patent: Jun. 18, 1996

[54] ROTARY BASE FOR TELEPHONES AND THE LIKE

[76] Inventor: Hossein Shahrebani, P.O. Box 81048, Salt Lake City, Utah 84108

[21] Appl. No.: 421,976

[22] Filed: Apr. 14, 1995

[51] Int. Cl.⁶ .................................................. H04M 1/00
[52] U.S. Cl. ........................ 379/438; 379/454; 379/447
[58] Field of Search ................................ 379/441, 437, 379/438, 451, 447, 454, 428; 439/22, 23, 24, 25, 26, 27, 28, 476

[56] References Cited

U.S. PATENT DOCUMENTS

| | | |
|---|---|---|
| 1,631,195 | 6/1927 | Ford . |
| 2,414,110 | 1/1947 | Lee et al. . |
| 2,512,933 | 6/1950 | Hampton et al. . |
| 4,533,796 | 8/1985 | Engelmove ........................ 379/438 |
| 4,560,831 | 12/1985 | Bast et al. . |
| 4,800,438 | 1/1989 | Yuter . |
| 5,109,411 | 4/1992 | O'Connell . |
| 5,209,446 | 5/1993 | Kawai . |

Primary Examiner—Jeffery Hofsass
Assistant Examiner—Jack Chiang
Attorney, Agent, or Firm—Thorpe, North & Western

[57] ABSTRACT

A rotary base for telephones and the like is disclosed, including a base and a plate for holding a telephone which is rotatable relative to the base. The rotatable plate is attached to the base by a coupling portion which enables rotation of the plate without causing twisting of a telephone line passing through the plate and the base. The ability to rotate a portion of the telephone cable without causing the chord to twist is enabled by a plurality of circular contacts attached to part of a telephone line on one side of a connection and a plurality of contacts which move along the circular contacts on an opposing side so that the connection is continuous as the plate is rotated.

15 Claims, 6 Drawing Sheets

ROTARY BASE FOR TELEPHONES AND THE LIKE

BACKGROUND OF THE INVENTION

The present invention relates to a rotary base for use with telephones and the like and, in particular, to a base which enables repeated rotation of a telephone or other device using a telephone chord without twisting the wires connecting the telephone to a telephone jack.

In the prior art there are numerous examples of telephone bases which can be used to rotate a telephone between a first position in which the telephone faces a first direction and a second position in which the telephone faces a different direction than it did in the first position. The reasons for such a telephone base are many. For example, in some companies two or more persons must share a telephone. This may be due to a sudden growth in employees, or the unavailability of multiple lines. By providing a rotatable base, it is easier for two people to share a telephone.

Another instance in which a rotatable base for a telephone is desired is when a person must move about his or her office to obtain information from different locations. By having the telephone mounted on a rotatable base, the functions provided by the telephone keypad can always be available to the user without having to reach over the telephone or attempt to read the keypad upside down.

Yet another situation where a rotatable base is desirable is where a computer is often used to send information by facsimile or by modem. By providing a rotary base, the computer can be used by two or more people, or may be used more conveniently by a single person.

Unfortunately, the prior art telephone bases are limited in that repeated rotation in one direction of the telephone on the base will ultimately result in the chord which connects the telephone to the telephone jack becoming twisted, or becoming wrapped around the telephone.

As will be appreciated by those skilled in the art, it is often inconvenient to continually change the direction one turns a telephone simply to ensure that the chord connecting the telephone to the telephone jack does not become twisted or wrapped about the telephone.

SUMMARY OF THE INVENTION

It is an object of the present invention to provide a rotary base for telephones and the like which enables the telephone to be rotated repeatedly without twisting the chord connecting the telephone to a telephone jack or causing the chord to wrap around the telephone.

It is another object of the present invention to provide a rotary base for telephones and the like which can be formed integrally with the telephone.

It is another object of the present invention to provide a rotary base for telephones and the like which is inexpensive.

It is another object of the present invention to provide a rotary base for telephones and the like which is easy to use.

The above and other objects of the invention are realized in specific illustrated embodiments of a rotary base for telephones and the like including a rotatable plate having a telephone jack type connection disposed therein and a base rotatably connected to the plate and also having a telephone jack. Disposed at the rotatable connection between the rotatable plate and the base is a rotatable line connection for coupling the telephone jack in the base to the telephone jack in the rotatable plate.

In accordance with one aspect of the invention, the rotatable plate is formed for receiving the base of a telephone and for supporting the telephone so that the rotatable base can be used with a conventional telephone.

In accordance with another aspect of the invention, the rotatable base is formed integrally with the base of the telephone so that the telephone jack type connection of the base is formed integrally with the telephone so that no external chord is needed to couple the telephone to a telephone jack in the base.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
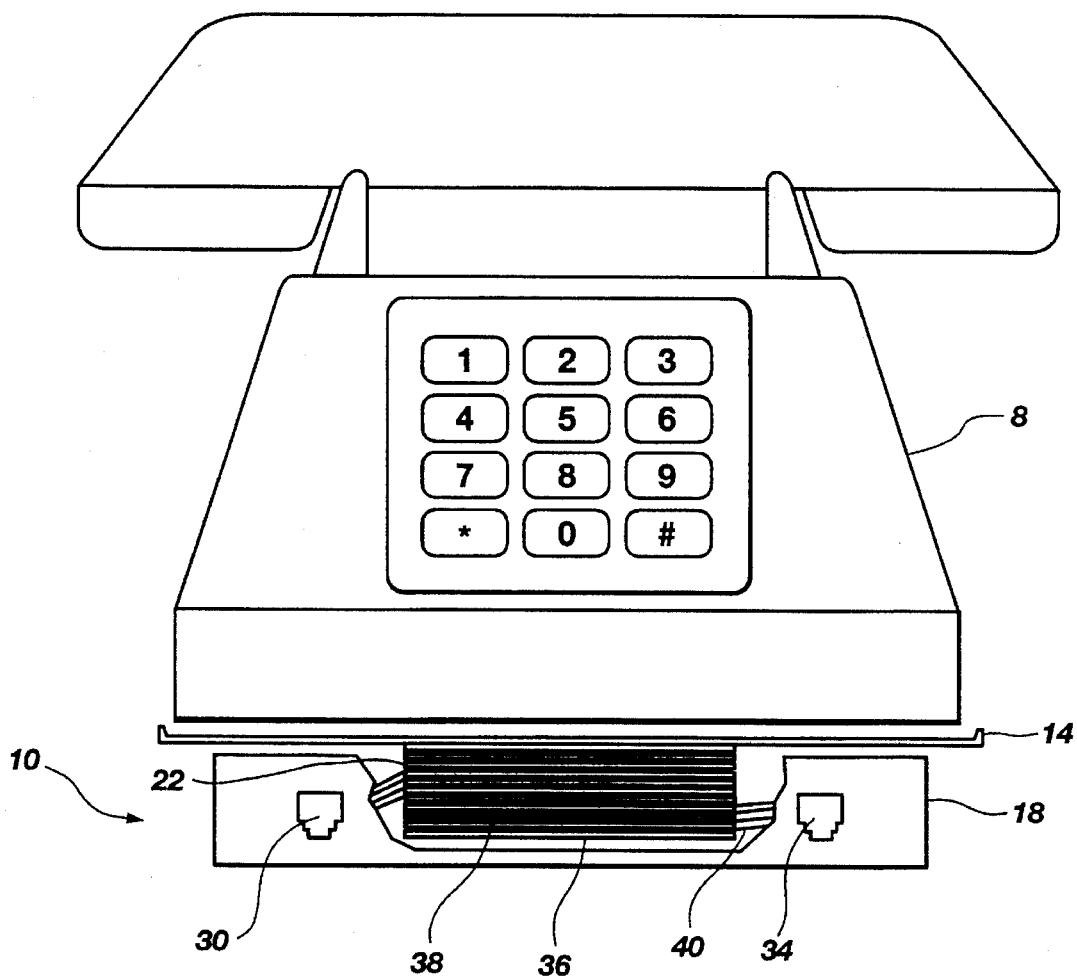
FIG. 1 shows a cut away perspective view of a telephone disposed on a rotary base made in accordance with the principles of the present invention.
Figure 2A:
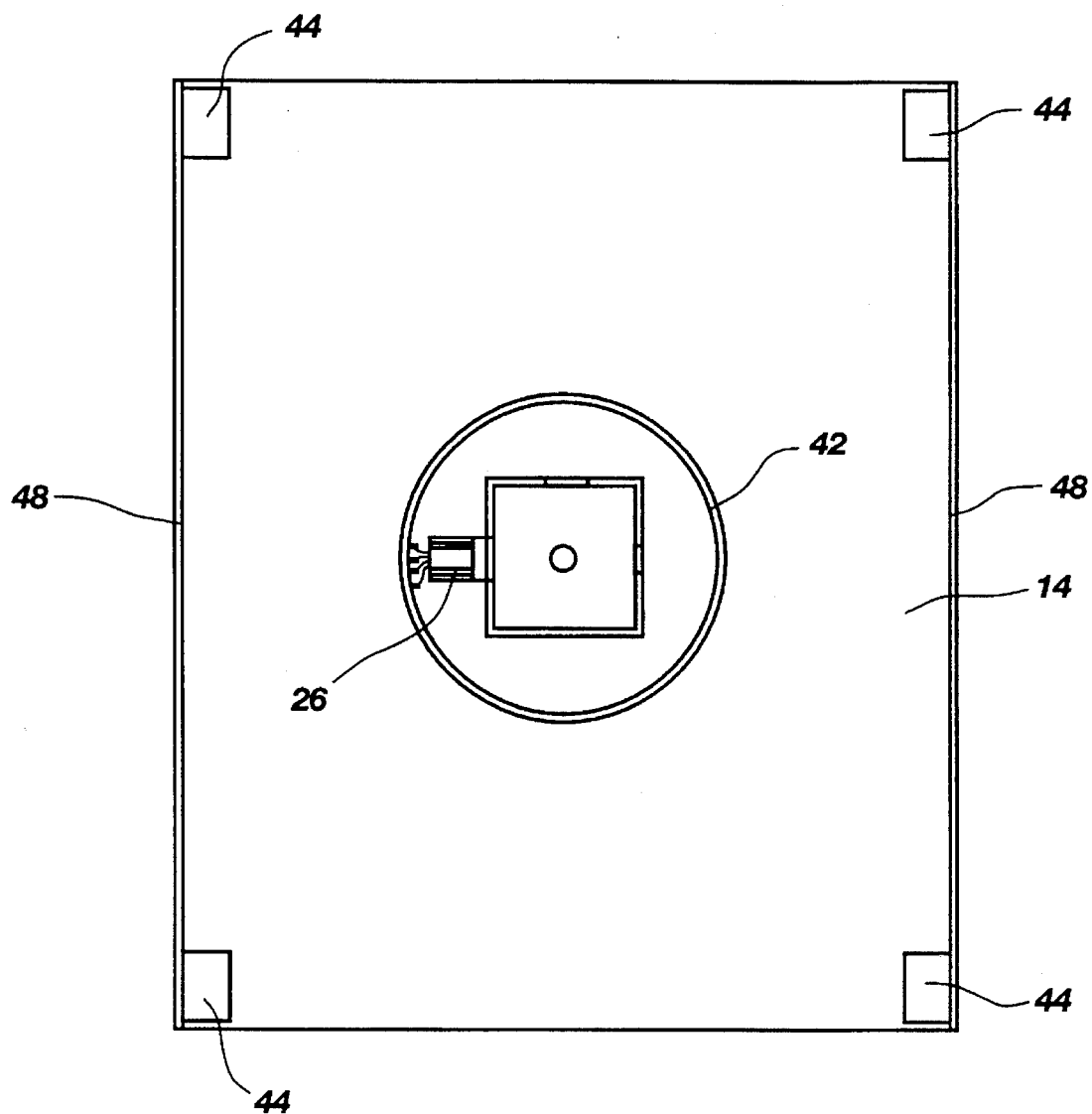
FIG. 2A shows a plan view of a rotatable plate configured for receiving a telephone.
Figure 2B:
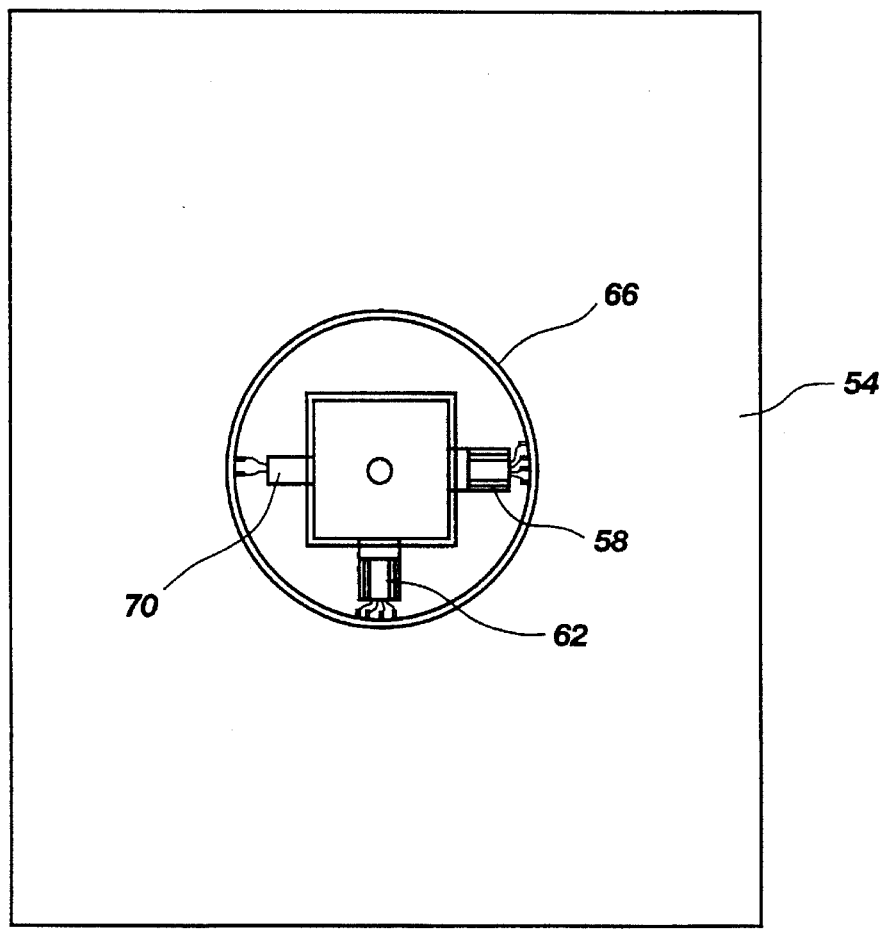
FIG. 2B shows a plan view of a preferred rotatable plate configured for receiving a small computer or a telephone/answering machine.

Reference will now be made to the drawings in which the various elements of the present invention will be given numeral designations and in which the invention will be discussed so as to enable one skilled in the art to make and use the invention. Referring to FIG. 1, 2A and 2B there is shown a telephone 8 and a rotary base for telephones and the like. The rotary base, generally indicated at 10 includes a rotatable plate 14, and a base 18 connected to the rotatable plate. The rotatable plate 14 and the base 18 are connected by a coupling portion 22 which is discussed in detail regarding FIGS. 4A and 4B.

The rotatable plate 14 is of an appropriate size for holding the base of a telephone. Obviously, plates 14 can be customized to provide a desired fit for any of the numerous telephones which are currently available on the market. A discussion of the same is provided regarding FIGS. 2A and 2B.

Disposed in the rotatable plate 14 is a telephone jack 26 (FIG. 2A) into which a telephone chord, not shown, may be attached. While shown in FIGS. 2A and 2B as being positioned at the center of the rotatable plate 14, the telephone jack 26 could be in numerous other locations.

A second telephone jack 30 is disposed within the base 18. The second telephone jack 30 will typically be connected to a conventional telephone jack disposed in a wall (not shown) by a telephone chord (not shown). Additionally, the second telephone jack 30 could be replaced by a retractable telephone chord which could be used to connect the base 18 with a conventional telephone jack disposed in a wall. A third telephone jack 34 may also be provided so that the telephone 8 may be connected to two different telephone lines.

Disposed within the base 18 is a coupling cylinder 36 which extends downwardly from the rotatable plate 14. Disposed about the cylinder 36 are a plurality of contacts 38 with are in continual contact with contacts extending from the second and third telephone jacks 30 and 34.

The arrangement shown allows the rotatable plate 14 to make repeated revolutions relative to the base 18 without twisting the telephone line as was done in prior art telephone bases. This arrangement increases the usability of the telephone and prevents damage to the telephone chords.

Referring specifically to FIG. 2A, there is shown a plan view of a simplified embodiment of a rotatable plate 14 made in accordance with the principles of the present invention. The rotatable plate 14 includes a center section 42 under which the plate is supported by the coupling portion 22 (FIG. 1). Near the middle of the center section 42 is the telephone jack 26.

Outward from the central section 42 may be disposed a plurality of impressions 44 formed in the plate. The impressions 44 are spaced so as to receive small pads (not shown) which are typically applied to the base of a telephone or other similar objects to prevent them from sliding on a smooth surface. By providing the impressions 44 in the rotatable plate 14, the risk that the telephone will accidently slide off or be knocked off the rotatable plate is significantly diminished. Likewise, a slip resistant mat may be placed on the rotatable plate 14. One or more side walls 48 may also be provided to prevent the telephone from being knocked off the rotatable plate 14. Those skilled in the art will appreciate that the impressions 44 may be placed at numerous different locations and may be formed in different shapes and sizes to best conform to the base of various types of telephones. Also, other retention devices may be provided to keep the telephone on the rotatable plate 14.

Referring now to FIG. 2B, there is shown a preferred embodiment of the present invention. The rotatable plate 54 includes a central section 58 about which the plate rotates. A plurality of impressions 62 are provided for receiving retention mechanisms of the base of a held object. The embodiment shown in FIG. 2B is adapted for use with either a telephone having an answering machine, or a portable computer, such as those commonly referred to as a "lap top".

As shown, two telephone jacks 58 and 62 are provided on the rotatable plate 54. The telephone jacks 58 and 62 may be positioned in the central section 66, or could be disposed at other locations on the rotatable plate.

Also shown in FIG. 2B is an electrical outlet 70 which is disposed in the center section 66 of the rotatable plate 54. The electrical outlet 70 provides power for an answering machine, for a telephone having features which require additional energy than that provided in the telephone lines, or for a lap top computer. The electrical outlet 70, of course, could also be connected about the periphery of the rotatable plate 54 to make attachment to an answering machine, etc., more convenient.

Figure 3:
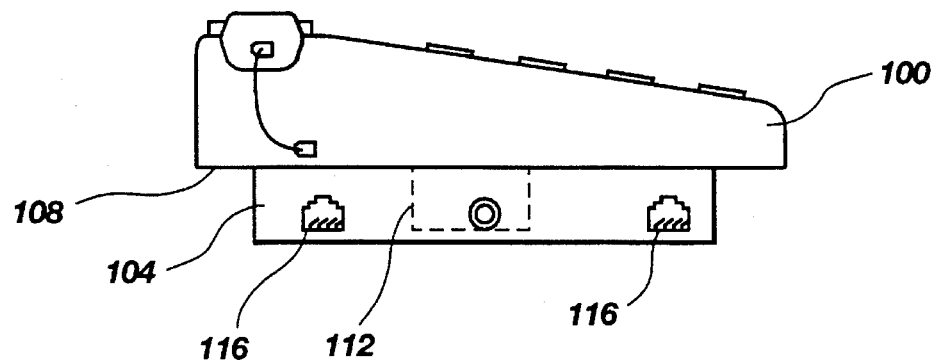
FIG. 3 shows a side view of telephone formed integrally with the rotatable plate.

Referring now to FIG. 3, there is shown a side view of a telephone 100 having a rotary base 104 made in accordance with the principles of the present invention formed integrally therein. Instead of having a resting on a rotatable plate (such as 14 in FIG. 1) the bottom/base plate 108 of the telephone 100 serves as the rotatable plate and obviates the need for telephone jacks as provided in the previously discussed embodiments.

The telephone base plate 108 is connected to the base 104 by a coupling portion 112 disposed within the base. As shown in FIG. 1, and as will be discussed in more detail regarding FIGS. 4A and 4B, a rotatable line connector disposed within the coupling portion 112 enables signals to be transferred to one or more conventional telephone jacks 116 in the base 104 without twisting the telephone line/chord, and without causing the line/chord to become wrapped about the telephone 100.

Figure 4A:
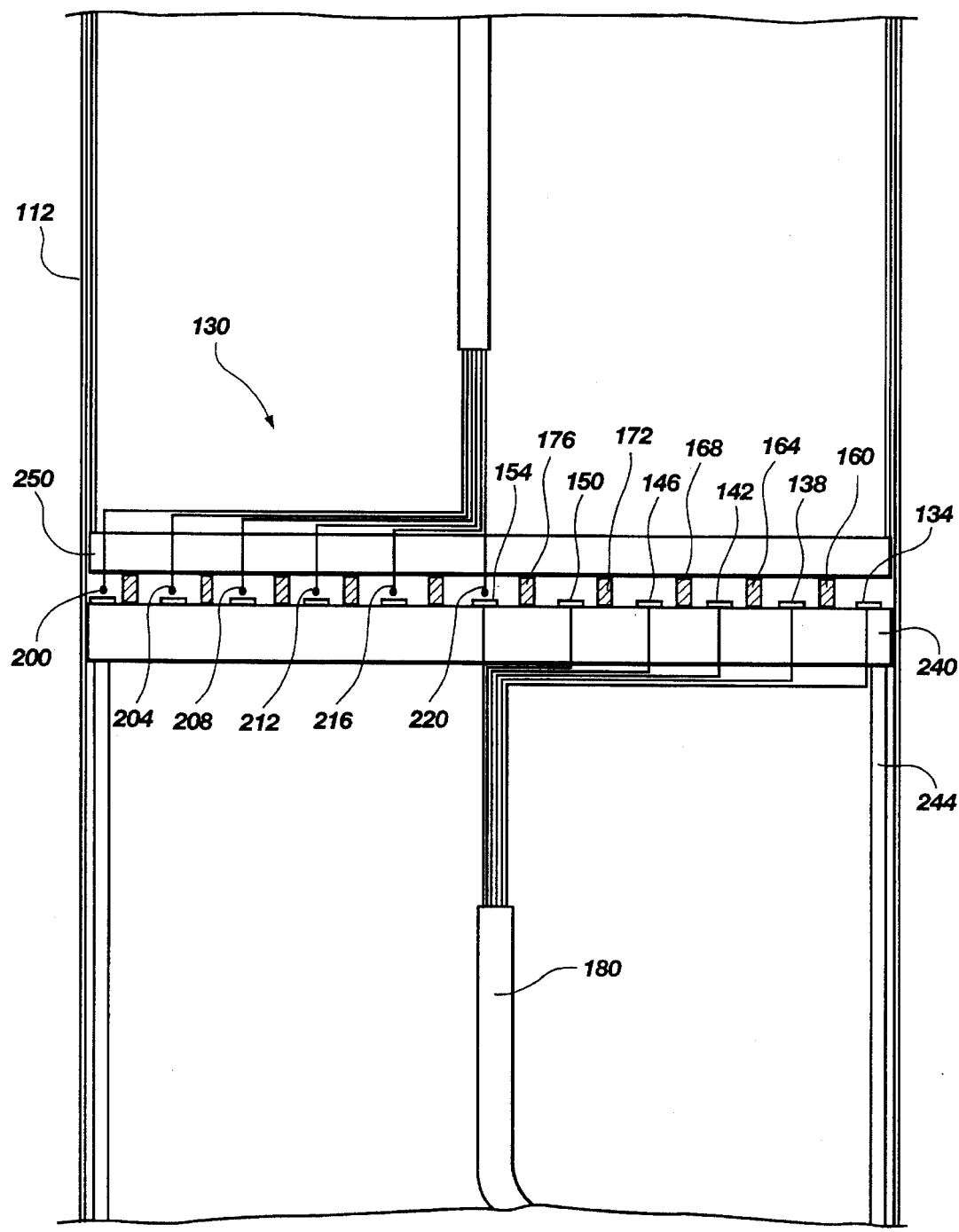
FIG. 4A shows a fragmented, side cross-sectional view of one embodiment of a coupling portion including a rotatable line connection made in accordance with the present invention.
Figure 4B:
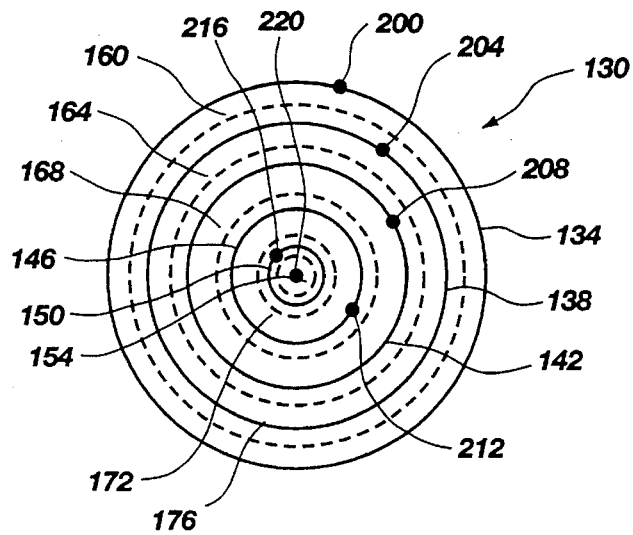
FIG. 4B shows a top view of the contacts of the embodiment shown in FIG. 4A.
Figure 5:
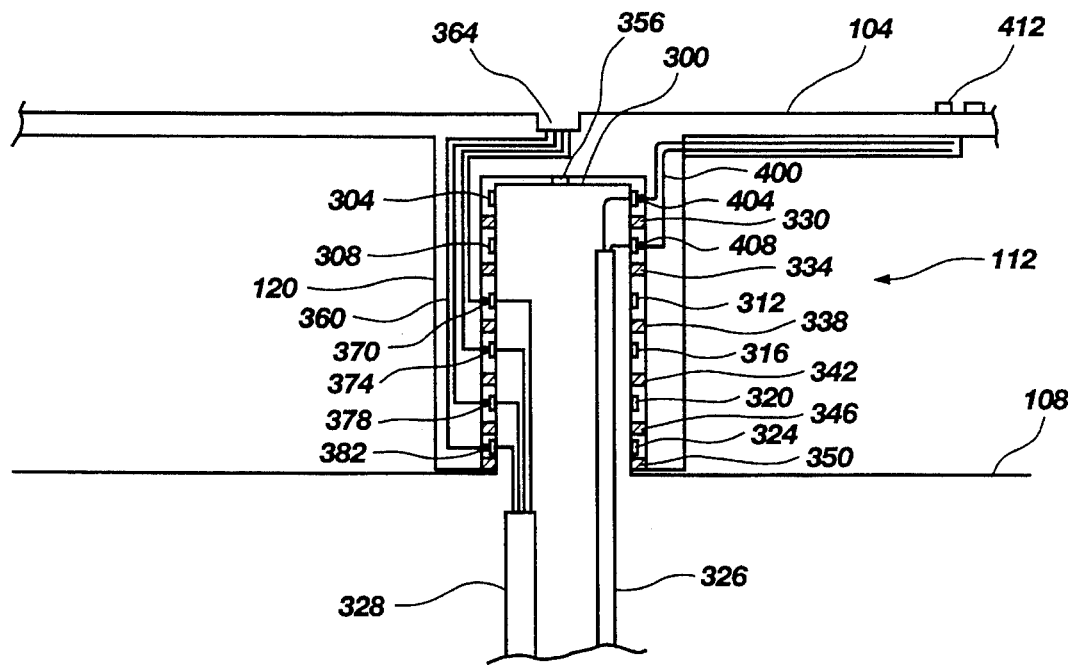
FIG. 5 shows a fragmented side cross-sectional view of yet another embodiment of the coupling portion and rotatable line connections made in accordance with the present invention.
Figure 6:
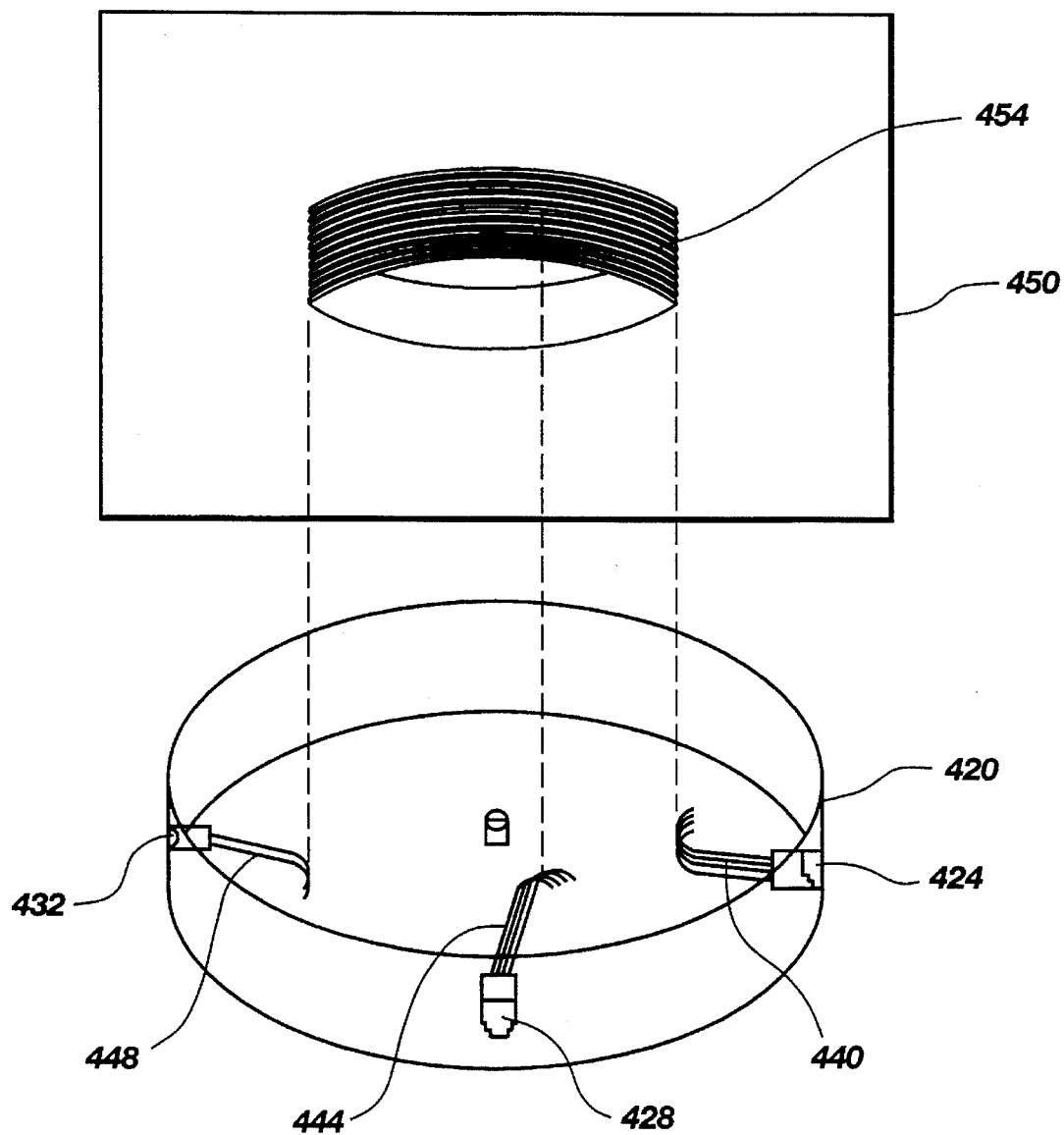
FIG. 6 shows an exploded view of a coupling portion for connecting a rotatable plate and base so as to maintain telephone line contact regardless of the number of revolutions of the rotatable plate.

Referring now to FIGS. 4A, 4B, 5 and 6, there is shown structures which may be used in the coupling portion 112 to enable rotation of the telephone without interfering with the telephone lines. The preferred embodiment is shown in FIG. 6. FIG. 4A shows a fragmented, side cross-sectional view of a rotatable line connector, generally indicated at 130, which may be disposed within the coupling portion 112. FIG. 4B shows a top view of the connectors shown in FIG. 4A.

In order to enable the rotatable plate (FIG. 1) to rotate relative to the base (FIG. 1) without twisting a telephone line passing therethrough, a rotatable line connector must be provided which includes a system of contacts that maintain a continuous connection as the plate and base are rotated with respect to one another.

As shown in FIGS. 4A and 4B the rotatable contact connector 130 comprises a plurality of concentric rings which form concentric line contacts, 134, 138, 142, 146, 150 and 154. The concentric line contacts 134, 138, 142, 146, 150 and 154 are preferably separated by insulative rings 160, 164, 168, 172 and 176 made rubber, plastic, ceramic or other nonconductive materials. The insulative rings 160, 164, 168, 172 and 176 prevent the concentric line contacts 134, 138, 142, 146, 150 and 154 from interfering with one another and causing static over the telephone line.

As the name implies, the concentric line contacts 134, 138, 142, 146, 150 and 154 are each connected to one of the wires within a conventional telephone line, indicated at 180. While six lines are shown in FIG. 4A, many modern telephones only require 4 lines. Of course additional lines could be provided if the telephone was to be connected to two telephone lines.

Disposed adjacent to the concentric line contacts 134, 138, 142, 146, 150 and 154 are a plurality of telephone circuit contacts 200, 204, 208, 212, 216 and 220. Each of the telephone circuit contacts 200, 204, 208, 212, 216 and 220 is a point contact, i.e. is movable along a circular path so that it remains in continuous contact with some point along a concentric line contact with which it is aligned. Thus, telephone circuit contact 200 is always in contact with line contact 134 (at some point around the line contact) no matter how many times the rotatable plate (FIGS. 1–3) is rotated relative to the base (FIGS. 1 and 3). Likewise, telephone circuit contact 204 is always in contact with line contact 138, telephone circuit contact 208 is always in contact with line contact 142, telephone circuit contact 212 is in continuous contact with line contact 146, telephone circuit contact 216 is always in contact with line contact 150 and telephone circuit contact 220 is always in contact with line contact 154. Of course, these point contacts could touch multiple points along the concentric contract to which they are aligned. The telephone circuit contacts connect to respective wires within a telephone line 230 which leads to the telephone circuitry (not shown).

As will be appreciated by those skilled in the art, the concentric contacts could be formed at the end of the telephone circuit line 230, and the point contacts formed at the end of the lines comprising the telephone line 180 with little effect on the present invention.

The concentric line contact rings 134, 138, 142, 146, 150 and 154 will typically be mounted to a support disk 240 which may be connected to the base (FIGS. 1 and 3) by a support wall 244 or other structure to hold the support disk in place. The telephone circuit contacts 200, 204, 208, 212, 216 and 220 are likewise held in position by a support disk 250 which is mounted to the rotatable plate (FIGS. 1–3) to ensure that the telephone circuit contacts rotate evenly with the rotatable plate.

While shown in FIG. 4A as being disposed in a linear fashion, the telephone circuit contacts 200, 204, 208, 212, 216 and 220 will typically be placed in some other pattern, as is shown in the top view provided in FIG. 4B, which separates the telephone circuit contacts to further decrease the risk of any two contacts interfering with one another. Those skilled in the art will be familiar with numerous different methods for spacing the contacts to prevent cross-talk, etc.

Referring now to FIG. 5, there is shown a fragmented, cross-sectional view of the coupling portion 112 and the attached rotatable plate 104 and base 108. Extending upwardly from the base 108 is an inner cylinder 300 having a plurality of line contact rings 304, 308, 312, 316, 320, and 324 disposed about an outer side of the cylinder in a linear array. The contact rings 304 and 308 are connected to a power supply line 326 disposed within the base 108. The other line contact rings 312, 216, 320 and 324 are connected to respective wires of a telephone line 328 disposed within the base 108.

Disposed about the inner cylinder 300 adjacent the line contact rings 304, 308, 312, 316, 320 and 324 are a plurality of insulation rings 330, 334, 338, 342, 346 and 350 made of rubber, plastic ceramic or some other nonconductive material. The insulation rings 330, 334, 338, 342, 346 and 350 serve two purposes. First, the insulation rings isolate each of the line contact rings 304, 308, 312, 316, 320, and 324 so that they do not interfere with one another. Second, the rings can be made a sufficient thickness that they help the outer cover 120, which forms a downward hollow cylindric projection from the rotatable plate 104, to rotate about the inner cylinder 300. For such a purpose, the insulation rings 330, 334, 338, 342, 346 and 350 could be lubricated. A rotatable connection 356 between the inner cylinder 300 and the outer cylinder forming the outer cover 120 could also be provided.

Disposed in the outer cover 120 are a first plurality of wires 360. At one end the wires 360 are connected to a conventional telephone jack which is disposed in the rotatable plate 104 or directly into a telephone. At an opposing end, the wires form telephone circuit contacts 370, 374, 378, and 382 which are in continuous contact with the line contact rings 312, 316, 320 and 324 respectively. No matter how far the outer cover 120 is rotated about the inner cylinder 300, the telephone circuit contacts remain in contact with their respected line contact rings. Thus, a telephone on the base 104 can be repeatedly rotated without twisting telephone lines or the necessity of rotating the telephone in an opposite direction after a set number of rotations.

Also disposed in the outer cover 120 is a second plurality of wires 400. At one end the wires 400 form power contacts 404 and 408 which continuously contact the line contact rings 330 and 334, respectively. At an opposing end the wires 400 form a power outlet 412 which can be used to provide power to devices which require more power than is supplied over a telephone line. For example, a telephone with an answering machine or a lap top computer generally requires an external power supply other than the telephone line. By providing a power outlet 412, these devices may be used on a rotatable plate in accordance with the teachings of the present invention.

Referring now to FIG. 6, there is shown an exploded view of a preferred embodiment of the invention. Positioned with the base 420 are two telephone jacks 424 and 428, and an out inlet 432. Each of the telephone jacks 424 and 428 and the power inlet 432 have line contacts 440, 444 and 448, respectively, which extend therefrom. As was discussed with respect to FIG. 1, the rotatable plate 450 has a cylindrical coupling portion 454 with a plurality of contacts 458 disposed thereon. The line contacts 440, 444 and 448 match-up with selective contacts disposed on the coupling portion 454 to convey telephone transmissions and power to a telephone or other device disposed on the rotatable plate 450. Those skilled the art will be familiar with numerous different arrangements which could be used to prevent cross-talk and other interference. As will be appreciated, the present embodiment is preferred because it is easy to use and to manufacture, and may be readily adapted for numerous different applications.

Thus, there is disclosed a rotary base for use with telephones and the like which allows the telephone or other device to be rotated repeatedly without twisting a line connecting the telephone to a conventional telephone jack disposed in a wall and without causing the telephone line to become wrapped around the telephone.

Those skilled in the art will recognize numerous modifications which may be made to the present invention without departing from the scope or spirit of the invention. The appended claims are intended to cover such modifications.

What is claimed is:

1. A rotary base for telephones or devices connected to a telephone wire comprising:

a base member having a telephone chord disposed therethrough;

a rotatable plate member in rotational attachment with the base for supporting a telephone base and enabling the telephone to rotate relative to the base, the rotatable plate having a telephone line positioned therethrough; and a coupling portion for rotatably attaching the plate member to the base member, the coupling portion comprising a rotatable line connection means for connecting the telephone chord disposed through the base member to the telephone line disposed through the rotatable plate such that the telephone line in the rotatable plate rotates relative to the telephone chord disposed in the base member without twisting the telephone line or the telephone chord.

2. The rotary base for telephones or devices connected to a telephone wire of claim 1, wherein the rotatable line connection means comprises a plurality of generally circular contacts for enabling the telephone line of the base member to remain in continuous contact with the telephone chord of the rotatable plate.

3. The rotary base for telephones or devices connected to a telephone wire of claim 2, wherein the plurality of circular contacts comprises a plurality of concentric contact rings, each concentric contact ring being a generally circular piece of conductive material connected to a wire of a telephone line.

4. The rotary base for telephones or devices connected to a telephone wire of claim 3, wherein the concentric contact rings are supported by a disk connected to the base member.

5. The rotary base for telephones or devices connected to a telephone wire of claim 3, wherein the concentric contact rings are supported by a disk connected to the rotatable plate.

6. The rotary base for telephones or devices connected to a telephone wire of claim 2, wherein the coupling portion further comprises insulation means disposed between the circular contacts for isolating each of said circular contacts so as to prevent interference between adjacent circular contacts.

7. The rotary base for telephones or devices connected to a telephone wire of claim 6, wherein the insulation means comprises a plurality of nonconductive rings.

8. The rotary base for telephones or devices connected to a telephone wire of claim 2, wherein the coupling portion further comprises a plurality of point contacts disposed so as to be in continuous contact with the plurality of circular contacts as the rotatable plate rotates relative to the base member.

9. The rotary base for telephones or devices connected to a telephone wire of claim 8, wherein the coupling portion further comprises a support disk for holding the point contacts in communication with the circular contacts.

10. The rotary base for telephones or devices connected to a telephone wire of claim 8, wherein the coupling portion comprises an inner cylinder and an outer cylinder disposed so as to rotate relative to the inner cylinder.

11. The rotary base for telephones or devices connected to a telephone wire of claim 10, wherein the plurality of circular contacts comprise contact rings disposed along the inner cylinder.

12. The rotary base for telephones or devices connected to a telephone wire of claim 11, wherein the point contacts are disposed between the outer cylinder and the inner cylinder such that each contact ring is in communication with a respective point contact so that respective contact rings and point contacts are in continuous contact with each other.

13. The rotary base for telephones or devices connected to a telephone wire of claim 12, wherein the coupling portion further comprises a plurality of insulation rings disposed between the outer cylinder and the inner cylinder.

14. The rotary base for telephones or devices connected to a telephone wire of claim 13, wherein at least one insulation ring is disposed between adjacent contact rings.

15. A rotary base for telephones or devices connected to a telephone wire comprising:

a base member;

a rotatable plate in rotational attachment with the base member for supporting a telephone base and enabling the telephone to rotate relative to the base member;

a rotatable coupling portion for rotatably attaching the plate member to the base member; and telephone connection means extending through the base member, rotatable plate and coupling portion, the telephone connection means including a telephone line attached to a and rotatable line connection means for enabling one end of the telephone line to rotate without causing rotation at an opposing end of the telephone line, and without twisting the telephone line, the rotatable line connection means comprising a plurality of circular contacts and a plurality of point contacts disposed along the circular contacts so that each point contact is in continuous communication with a respective circular contact.

* * * * *